United States Patent
Decato et al.

(10) Patent No.: US 12,517,528 B2
(45) Date of Patent: Jan. 6, 2026

(54) TECHNOLOGIES FOR ISOLATING REGIONS OF A WATER DISTRIBUTION NETWORK

(71) Applicant: Watts Regulator Co., North Andover, MA (US)

(72) Inventors: Christopher Decato, Northfield, NH (US); Drew P. LaMarca, Island Heights, NJ (US); Ian David Baynes, Merrimac, MA (US)

(73) Assignee: Watts Regulator Co., North Andover, MA (US)

( * ) Notice: Subject to any disclaimer, the term of this patent is extended or adjusted under 35 U.S.C. 154(b) by 887 days.

(21) Appl. No.: 17/678,218

(22) Filed: Feb. 23, 2022

(65) Prior Publication Data

US 2023/0266776 A1 Aug. 24, 2023

(51) Int. Cl.
*G05D 7/06* (2006.01)
*E03B 7/07* (2006.01)
*G05B 15/02* (2006.01)

(52) U.S. Cl.
CPC .......... *G05D 7/0647* (2013.01); *E03B 7/071* (2013.01); *G05B 15/02* (2013.01)

(58) Field of Classification Search
CPC ...... G05D 7/0647; G05B 15/02; E03B 7/071; E03B 7/075
See application file for complete search history.

(56) References Cited

U.S. PATENT DOCUMENTS

| | | | |
|---|---|---|---|
| 4,200,911 A | 4/1980 | Matsumoto | |
| 5,460,196 A | 10/1995 | Yonnet | |
| 5,708,195 A * | 1/1998 | Kurisu | G01M 3/2815 73/40 |
| 6,032,699 A * | 3/2000 | Cochran | F16L 11/20 138/104 |
| 7,201,180 B2 | 4/2007 | Ephrat et al. | |

(Continued)

OTHER PUBLICATIONS

Data Sheet, "PRV Control. Precise PRV Pressure Control and Optimisation", Intelligent Water Networks, www.i2owater.com, Southampton, UK, https://en.i2owater.com/wp-content/uploads/2020/04/i2O_PRV-Control-Datasheet_2020.pdf, 2020, 2 pages.

(Continued)

*Primary Examiner* — Christopher W Carter
(74) *Attorney, Agent, or Firm* — Grossman, Tucker, Perreault & Pfleger, PLLC

(57) ABSTRACT

Systems for isolating a region of a water distribution network are disclosed. In embodiments the systems and methods utilize at least one control valve system that includes a valve, a pressure sensor, an actuator, and a controller. The controller determines a water pressure at the control valve system based at least in part on a sensor signal from the pressure sensor. When the detected pressure is less than or equal to a low pressure threshold the controller issued a control signal that causes the actuator to move the valve to a fully closed position. Multiple control valve systems may be employed to isolate a region of a water distribution network. Methods of isolating a portion of a water distribution network, water distribution network including a control valve system, and control valve systems for use in water distribution networks are also disclosed.

15 Claims, 11 Drawing Sheets

(56) References Cited

U.S. PATENT DOCUMENTS

| | | | |
|---|---|---|---|
| 9,493,931 | B2 | 11/2016 | Burrows |
| 9,644,349 | B2 | 5/2017 | Burrows |
| 10,095,246 | B2 | 10/2018 | Yokokawa et al. |
| 11,105,440 | B2 | 8/2021 | Magda et al. |
| 2009/0235992 | A1* | 9/2009 | Armstrong .......... G01M 3/2807 137/487.5 |
| 2011/0232770 | A1* | 9/2011 | Baggett ................. A01G 25/16 137/12 |
| 2017/0044744 | A1* | 2/2017 | Everhart ............. G01M 3/2815 |
| 2017/0131174 | A1* | 5/2017 | Enev ................... G01M 3/2815 |
| 2018/0348081 | A1* | 12/2018 | Levine ................... G01M 3/04 |
| 2020/0103306 | A1* | 4/2020 | Mine ..................... G01M 3/007 |

OTHER PUBLICATIONS

Jones, "Logger 17 User Manual", V2.3, I2O Calm Water, 2018, www.i2owater.com, pp. 1-23.

Data Sheet, "Advanced Pressure Management. Remotely Control and Automatically Optimise Pressure Throughout your Network", Southampton, UK, https://en.i2owater.com/wp-content/uploads/2021/01/i2O_Advanced-Pressure-Management-Datasheet_2020.pdf, 2020, 2 pages.

Malo, "Automatic Control Valves Can Help Safely Maintain Tank and Reservoir Levels", ES&E Magazine, 2017, 3 pages.

Cello 4S, "A Remote Telemetry Outstation Delivering a Scalable and Versatile Solution for Reducing Operating and Capital Costs", 2099DS9000 Issue J & DMR, Technolog Limited, Wirksworth, UK, 2020, 2 pages.

Case Study, "Non-Revenue Water Reduction", CS91015 & DMR 7001, Technolog Limited, Wirksworth, UK, 2017, 1 page.

106-SC Product Pages, Models 106-SC / 206-SC, Solenoid Control Valve, 2016, pp. 184-186.

106-2SC PCO Product Pages, Models 106-2SC-PCO / 206-2SC-PCO, Dual Solenoid Control for Positioning and Scada Controls, 2016, pp. 187-189.

106-2SC MV Product Pages, "Models 106-2SC-MV / 206-2SC-MV, Electronic Flow Control and Metering Valve", 2016, pp. 194-196.

Jenks et al., "Mobile District Metered Area Testing Helps Cut Watermain Leak Losses", Environmental Science & Engineering Magazine, 2020, pp. 20-23.

Regulo PRV Controller, "A Proven Solution for Reducing Leakage and Burst Frequency, Bringing Intelligent Cost Effective Pressure Control to Your Network", 2150DS9000 Issue A & DMR, Technolog Limited, Wirksworth, UK, 2020, 2 pages.

WaterCore, "An Intuitive, Web-Based Data Collection and Management Solution Providing Comprehensive Tools for Site Visualisation, Analytics and Pressure Management", DSZ19003 Issue B & DMR, Technolog Limited, Wirksworth, UK, 2017, 4 pages.

Jones, "PRV Control System, Installation and Commissioning Manual", www.i2owater.com, Issue 1.1, Southampton, UK, 2017, pp. 1-11.

* cited by examiner

TECHNOLOGIES FOR ISOLATING REGIONS OF A WATER DISTRIBUTION NETWORK

TECHNICAL FIELD

The present disclosure relates to technologies for isolating one or more regions of a water distribution network. In particular, the present disclosure relates to systems that include one or more control valve systems that can isolate one or more regions of a water distribution network. Methods of isolating one or more regions of a water distribution network are also disclosed.

BACKGROUND

Water distribution networks are often configured to convey water from a pressurized water source/supply to one or more destinations, such as a municipality, a neighborhood, a building, an irrigation system, and the like. For example, municipalities often have a water distribution network that includes piping (supply lines) that fluidly connect a water supply to a water storage facility (e.g., a water tower) and piping (distribution lines) that fluidly connect the water storage facility to one or a plurality of outlets, such as residential, commercial, and municipal buildings, farms, and the like. FIG. 1 is a simplified block diagram of one example of a common water distribution network. As shown, system 100 includes a water supply 101 (e.g., a reservoir, water purification plant, or the like), a water storage facility 105 (e.g., a water tower) fluidly coupled to the water supply 101 via supply lines 103 (e.g., first pipes), and one or more outlets 109 (e.g., buildings, farms, etc.) fluidly coupled to the water storage facility by distribution lines 107 (e.g., second pipes). The supply lines 103 and distribution lines 107 may be or include large diameter pipes that can convey a large volume of water under relatively high-pressure. Such lines are also frequently buried (e.g., under roadways) or other infrastructure items.

Under normal operation water from water supply 101 is conveyed under pressure through supply lines 103 to water storage facility 105, after which it is conveyed under pressure through distribution lines 107 to outlets 109. When there is a break or leak in supply lines 103 and/or distribution lines 107, a significant amount of water may be lost through the break/leak. The water escaping through the leak/break may also cause considerable damage to surrounding structures. For example, if a break occurs in a supply line 103 or distribution line 107 that is underneath a road, the escaping water may erode the support of the road and eventually cause the road to collapse. The damage may continue until a service crew can arrive on the scene and manually shut down the supply of water from water supply 101. Even if the supply of water from water supply 101 is shut off, water stored in water storage facility 105 may continue to flow through the break/leak until the water contained in the water storage facility 105 is expended.

In sum, a break or leak in a supply and/or distribution line of a water distribution network can result in considerable damage and loss of copious amounts of water. With that in mind, fresh water is becoming increasing scarce in certain parts of the world such as the west and mid-west portions of the United States. Consequently, governments and municipalities are beginning to pass and enforce legislation that requires water consuming entities such as municipalities, agriculture, and the like to take advanced steps to conserve water resources. Accordingly, there is a need in the art for technologies that can quickly and independently isolate a region of a water distribution network if/when a break or leak in the network develops. The present disclosure is aimed at such needs.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Although the following Detailed Description will proceed with reference being made to illustrative embodiments, many alternatives, modifications, and variations thereof will be apparent to those skilled in the art.

DETAILED DESCRIPTION

Figure 1:
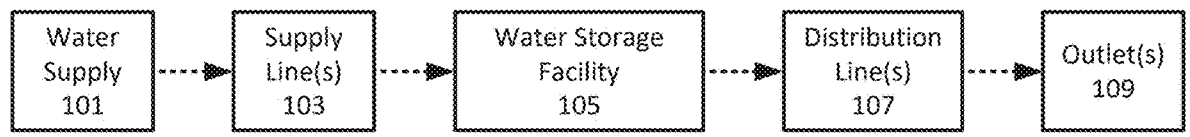
FIG. 1 is a block diagram of a prior art water distribution network
Figure 2A:
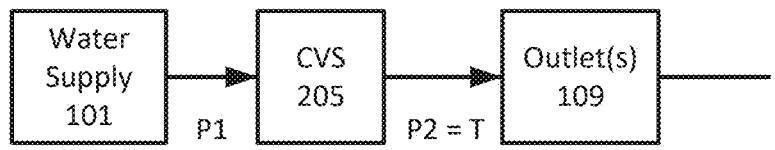
FIG. 2A is a block diagram of a portion of one example of a water distribution network that includes a prior art control valve system (CVS 205) including a prior art automatic control valve (ACV)

As noted in the background, governments are beginning to pass and enforce legislation that aims to conserve fresh water, e.g., by requiring water consuming entities to take advanced steps to conserve water resources. With that in mind, the inventors have recognized that there is a need and opportunity to conserve water by improving the ability of a water distribution network to react to a leak. To illustrate this opportunity reference is made to FIGS. 2A-2C. FIG. 2A depicts one example of a prior art water distribution network 200 that includes a water supply 101 that is fluidly coupled to a control valve system (CVS) 205, which in turn is fluid coupled to one or more outlets 109. The water supply 101 supplies water to the CVS 205 via supply lines (not labeled)

at a first pressure (P1), which may be in the range of greater than 0 to 150 pounds per square inch (PSI) or more. CVS 205 is configured to regulate (e.g., step down) the pressure of the water from water supply 101, and to provide water to outlets 209 at a second pressure (P2), wherein P2 is equal to a target pressure (T) that may be set by a municipality, building code, or the like.

Figure 2B:
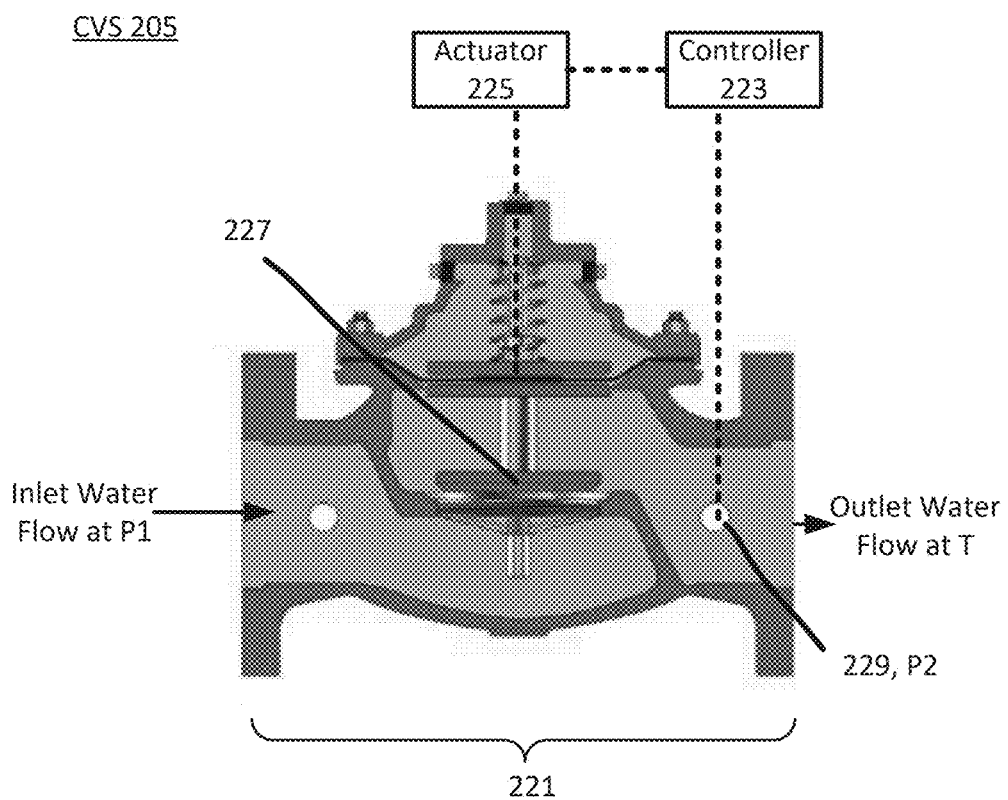
FIG. 2B is a block diagram of the prior art control valve system (CVS 205) of the system of FIG. 2A.

FIG. 2B schematically illustrates one example of a typical CVS 205. As shown, CVS 205 includes a valve assembly 221, a controller 223, and an actuator 225. The valve assembly 221 includes a valve 227 that is movable between an open and a closed position by actuator 225. Actuator 225 controls the position of valve 227 responsive to a control signal from controller 223. Controller 223 issues control signals to actuator 225 responsive to a sensor signal from sensor 229, e.g., a pressure sensor that is configured to detect the water pressure in a region downstream of valve 227. More specifically, during normal operation water flows into an inlet of valve assembly 221 at a first pressure P1. Water flows through valve assembly 221 when valve 227 is not in a fully closed position. Sensor 229 detects a pressure (P2) of the water at a region downstream of valve 227 (e.g., proximate the outlet of valve assembly 221 and transmits a sensor signal indicative of the detected pressure to controller 223. Controller 223 determines the detected pressure (P2) from the sensor signal, and compares P2 to a target pressure T. If the detected pressure is greater than T, controller 223 issues a control signal to actuator 225, causing actuator 225 to drive valve 227 to move to a more closed position to reduce the detected pressure to the target pressure. If the detected pressure P2 is less than T, however, controller 223 issues a control signal to actuator 225, causing actuator 225 to drive valve 227 to move to a more open position to increase the flow through valve 227 to increase P2 to T. This concept is illustrated in FIG. 2C, which is a plot of valve position (% ACV closed) versus detected pressure P2.

Figure 2C:
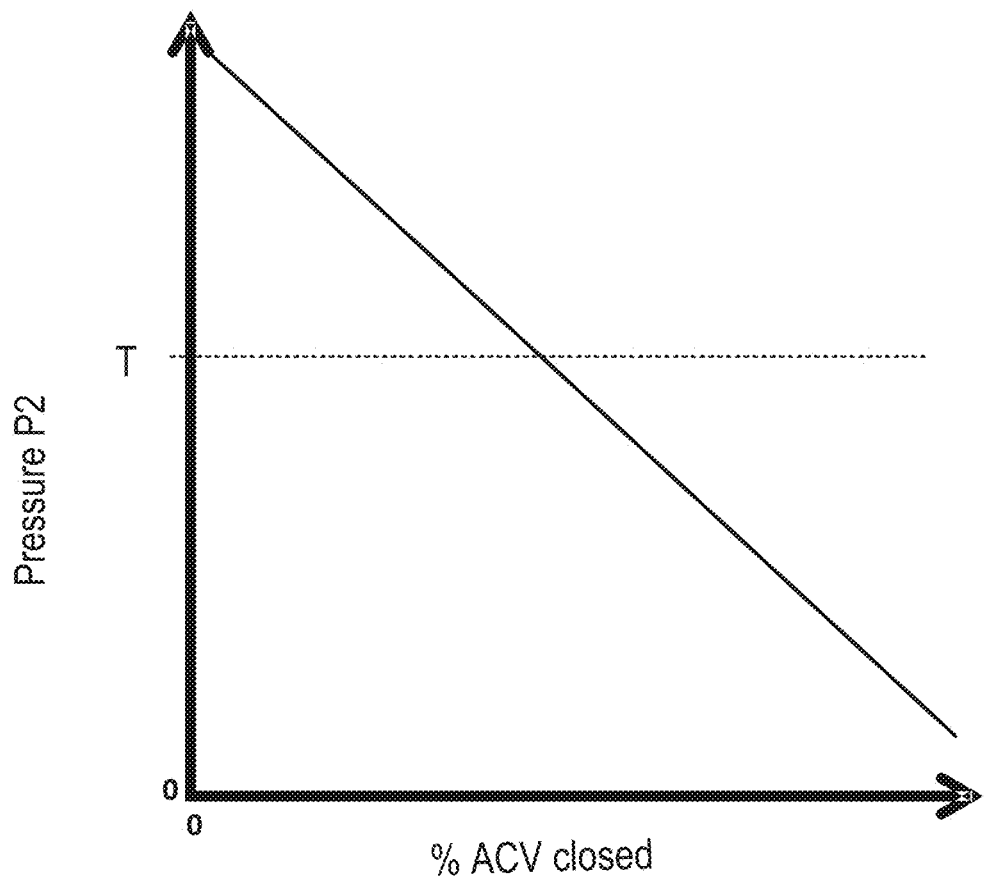
FIG. 2C is a plot of valve position (% ACV closed) versus pressure for a prior art ACV.

While the system of FIGS. 2A-2C is useful, it is not without drawbacks. For example—and with further reference to FIG. 2A—consider a scenario in which a distribution line between CVS 205 and outlets 209 bursts, resulting in a leak. In such a scenario sensor 229 would detect a drop in pressure P2 in the region downstream of valve 227 and would issue a sensor signal indicative of that drop in pressure to controller 223. In response to that sensor signal controller 223 would determine that P2 is less than T, and issue a control signal to actuator 225 that causes actuator 225 to cause valve 227 to move to a more open position—increasing the flow of water through CVS 205 to compensate for the drop in pressure P2. As more water is allowed to flow through CVS 205, more water will be lost through the break in the distribution line. If the break becomes worse (e.g., becomes larger), sensor 229 will detect a further drop in pressure P2 and issue a sensor signal to controller 223, which in turn will issue a control signal that causes actuator 225 to open valve 227 even further—further exacerbating the loss of water through the break until valve 227 valve is manually shut off by a service crew. Put differently, CVS 205 is configured such that it will increasingly open valve 227 responsive to a drop in pressure (relative to a target pressure) until the valve 227 is in a fully open position. While this can be useful in normal operating conditions (e.g., in times of peak demand), it can result in copious amounts of lost water if the pressure drop detected by sensor 229 is the result of a leak in the water distribution network.

With the foregoing in mind, aspects of the present disclosure relate technologies (e.g., systems and methods) for isolating one or more regions of a water distribution network responsive to a detected flow condition. In embodiments, the technologies include a control valve system (CVS) for use in a water distribution network. The CVS includes a valve assembly, a first sensor, and a controller. The valve assembly includes a controllable valve (e.g., an automatic control valve) that is movable by an actuator between a fully open position and a fully closed position. The first sensor is configured to detect a water pressure (P2) in a region downstream of the controllable valve and issue a control signal indicative of P2 to the controller. The controller is configured to determine P2 from the sensor signal and compare P2 to a low-pressure threshold (LPT). When P2 is less than or equal to the LPT (e.g., when a leak or other condition causes a significant drop in pressure), the controller may issue a (first) control signal that is configured to cause the actuator to move the controllable valve to a fully closed position, thereby shutting off the flow of water through the valve assembly and preventing further supply of water downstream of the CVS.

As will be described, multiple CVS can be implemented at strategic points in a water distribution network and can operate to isolate a region of a water network. For example, in embodiments the present disclosure relates to a water distribution network that includes an area of interest AOI that is fluidly coupled to a water supply. The water distribution network further includes a first CVS upstream of the AOI, and a second CVS downstream of the AOL. The first CVS includes a first valve assembly, a first sensor, and a first controller, and the second CVS includes a second valve assembly, a second sensor, and a second controller. The first valve assembly includes a first valve and a first actuator for controlling a position of the first valve, and the second valve assembly includes a second valve and a second actuator for controlling a position of the second valve. The first sensor is configured to detect a water pressure (PD1) in a region downstream of the first valve and issue a first sensor signal to the first controller, and the second sensor is configured to detect a water pressure (PD2) in a region downstream of the second valve and issues a second sensor signal to the second controller. The first controller is configured to determine the first detected pressure PD1 from the first sensor signal and compare PD1 to a first low-pressure threshold (LPT1). The second controller is configured to determine the second detected pressure (PD2) from the second sensor signal and compare PD2 to a second low pressure threshold (LPT2), which may be the same or different than LPT1. When PD1≤LPT1, the first controller is configured to send a first control signal to the first actuator, causing the first actuator to move the first valve to a fully closed position. Likewise, when PD2≤LPT2, the second controller is configured to send a second control signal to the second actuator, causing the second actuator to move the second valve to a fully closed position. When both the first and second valves are in their respective fully closed positions, the first and second valve assemblies may be considered to "isolate" the AOI in that they prevent flow of water into and from the AOI.

Additional CVS' may also be used. E.g., a third CVS may be used and may include a third pressure sensor to detect a third water pressure (PD3). In such instances a (third) controller of the third CVS may compart PD3 to a third low pressure threshold (LPT3—which may be the same as or different from LPT1 and LPT2) and issue a control signal that causes a third valve in the third CVS to move to a fully closed position when PD3≤LPT3.

Put differently, embodiments of the present disclosure are drawn to systems and methods for isolating a region (i.e., an area of interest) of a water distribution network responsive to an event, such as a leak resulting from a burst pipe. As used herein, the term "isolated" is used to indicate that the supply of water into the AOI from a region upstream of the AOI is cutoff, both from an upstream (supply) direction and a downstream (e.g., backflow) direction. In embodiments, the systems described herein include a plurality of control valve systems (CVS) consistent with the present disclosure. Each CVS includes a controllable valve, a sensor, and a controller. The sensor is configured to detect a water pressure at a location downstream of the controllable valve (e.g., proximate an outlet of the CVS) and issue a control signal indicative of the detected water pressure (DP) to the controller. The controller is configured to determine the DP from the sensor signal. The controller is further configured to compare DP to a low-pressure threshold LPT, wherein the low-pressure threshold is a pressure that is indicative of a leak downstream or upstream of the control valve system. When the controller determines that DP≤LPT, it issues a control signal that causes the controllable valve to move to a fully closed position. For example, the controller may issue a control signal to an actuator (e.g., a pilot) for the controllable valve, wherein the control signal causes the actuator to move the controllable valve to the fully closed position. With such a system, a plurality of CVS' in a water distribution network may automatically move their controllable valves to the fully closed position responsive to a pressure drop below LPT, e.g., resulting from a leak occurring at an area of interest between a respective two of such valves. As a result, the systems and methods described herein can isolate the region between a respective two or more CVS' consistent with the present disclosure responsive to a drop below an LPT. This is significantly different from CVSs of the prior art and as described above in connection with FIGS. 2A-2C, which are configured to drive a controllable valve further open responsive to a drop in pressure.

Figure 3A:
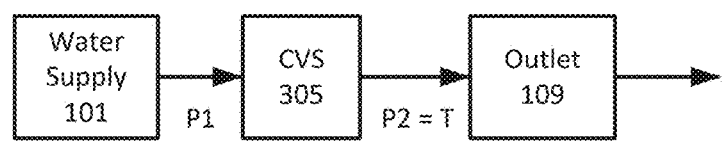
FIG. 3A is a block diagram of a water control system for a water distribution network that includes a control valve system consistent with the present disclosure.

FIG. 3A illustrates one example of a simplified water distribution network system consistent with the present disclosure. As shown, system 300 includes a control valve system (CVS) that is fluidly coupled to a water supply 101 and an outlet 109. The water supply 101 is configured to supply water at a pressure P1 to an inlet of CVS 305 or, more specifically, to an inlet of a valve assembly 321 within CV1 305. Water supply 101 may be any suitable supply of water, such as a municipal water supply, a reservoir, a water storage tank, or the like. P1 may be any suitable pressure, and in embodiments is a pressure ranging from greater than or equal to 25 pounds per square inch (PSI) to about 300 PSI or more, such as from about 50 to about 300 PSI, or even from about 100 to about 300 PSI. In this embodiment, CVS 305 is configured to regulate the pressure of water supplied to outlet 109. For example, CVS 305 may be configured to automatically regulate the pressure of water supplied to outlet 109, e.g., such that a pressure P2 downstream of a controllable valve within CVS 305 is equal to a target pressure T, where T=P2<P1.

For simplicity and ease of explanation system 300 is shown as including a single CVS 305. The systems and methods described herein are not limited to such a configuration, however, and any suitable number of CVS 305's may be used. In embodiments system 300 includes a plurality of CVS 305's, i.e., at least 2, 3, 4, 5, 6, 7, 8, 9, 10 or more CVS 305's, wherein each CVS is located at a desired part of the water distribution network. System 300 may also optionally include an inlet gate valve between CVS 305 and water supply 101, and/or an outlet gate valve between CVS 305 and the outlet 109. When used, such inlet and outlet gate valves may have an open state that permits fluid flow through system 300, and a closed state in which fluid flow through system 300 is prevented.

Figure 3B:
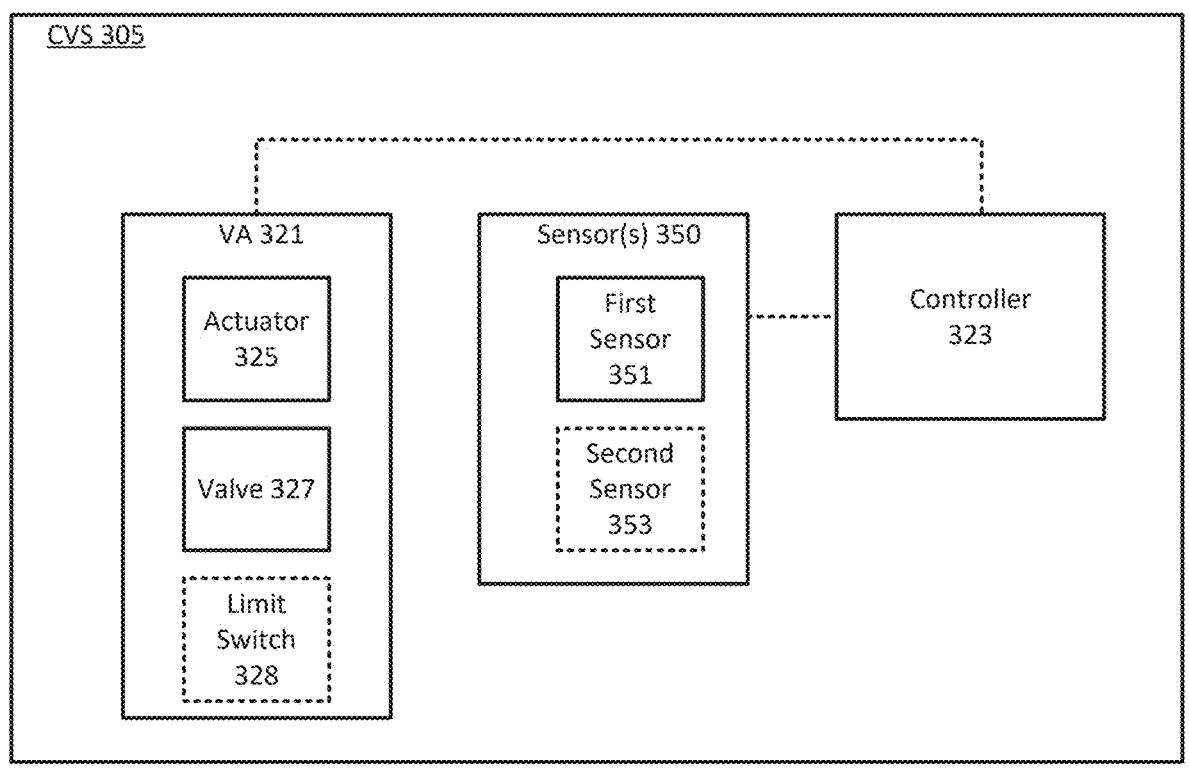
FIG. 3B is a block diagram of one example of a control valve system (CVS) consistent with the present disclosure.

FIG. 3B is a block diagram illustrating the components of CVS 305. As shown, CVS 305 includes a valve assembly (VA) 321, one or more sensor(s) 350, and a controller 323. Valve assembly 321 includes an actuator 325, a valve 327, and an optional limit switch 328. Valve 327 is a controllable valve that can be moved (e.g., by actuator 325) between a fully open and a fully closed (watertight) position. The valve 327 includes an inlet for receiving a supply of water from water supply 101 and an outlet for conveying a supply of water to a distribution line for conveyance to outlet 109. In embodiments, VA 321 is or includes an automatic control valve (ACV).

VA 321 may be or include any suitable electronically or mechanically controlled valve assembly. Non-limiting example of valve assemblies that can be used as VA 321 include the LF113 series valve assemblies sold by WATTS®, such as the LF113FP valve assembly. In any case VA 321 includes at least one valve 327, wherein a set point of the valve may be adjusted by an actuator 325 (or "pilot,"). Any suitable type of actuator 325 may be used to adjust the position of the valve 327 within VA 321. Non-limiting examples of suitable actuators include solenoids, a pressure regulating valve, motorized ball valves, combinations thereof, and the like. Without limitation, in embodiments actuator 325 is or includes one or more solenoids (e.g., a proportional solenoid) that can control the position of valve 327. In those or other embodiments, the actuator 325 may be capable of incrementally moving valve 327 between a fully closed (watertight) position and a fully closed position, e.g., in response to a control signal from controller 323. Without limitation, actuator 325 and valve 327 are coupled to and/or integral with each other and are in the form of or include a solenoid control valve.

In embodiments, during normal operation the position of valve 327 within VA 321 may be set to achieve a fluid pressure P2, e.g., proximate the outlet of valve 327. In non-limiting embodiments, the position of the valve 327 may be set such that P2 is at least substantially equal to a target pressure, e.g., when CVS 305 is a pressure regulating valve for system 300. In any case, CVS 305 may be configured such that valve 327 is driven to a fully closed (watertight) position when the pressure P2 falls below a low-pressure threshold (LPT), as described in further detail later.

Sensor(s) 350 preferably include at least one sensor that is configured to detect fluid (water) pressure within a plumbing system. In that regard and as shown in FIG. 3B, sensor(s) 350 may include a first sensor 351, wherein the first sensor 351 is configured to detect a fluid (water) pressure, e.g., at a location proximate the outlet of CVS 305 or, more specifically, or valve 327. In embodiments, first sensor 351 is or includes a pressure sensor, such as but not limited to a mechanical pressure sensor, digital pressure sensor (e.g., with an analog or a digital output), microelectromechanical machine (MEMS) pressure sensor, piezoelectric pressure sensor, a combination thereof, and the like. Without limitation, first sensor 351 is preferably a digital pressure sensor.

In general, first sensor 351 is configured to detect a fluid pressure P2, wherein P2 is a gauge pressure corresponding to the outlet fluid pressure of CVS 305. In embodiments, first sensor 351 is configured to detect P2 within CVS 305, at an outlet of valve 327, and/or downstream of an outlet valve 327. Regardless of where it is measured, P2 corresponds to the outlet pressure of the fluid (water) after it passes through CVS 305 or, more particularly, after it passes through valve 327.

First sensor 351 is further configured to produce a first sensor signal that is indicative of P2, and to provide the first sensor signal to controller 323. The first sensor signal may be a mechanical (e.g., pneumatic, hydraulic, etc.) signal, a digital signal, or an analog signal. Preferably the first sensor signal is a digital signal. In that regard first sensor 351 may be configured to communicatively couple to controller 323 in any suitable manner, such as via a wired or wireless communication protocol. In embodiments first sensor 351 is communicatively coupled to controller 323 via a wire, such that the first sensor signal can be communicated from first sensor 351 to controller 323 via a wired communications protocol. In other embodiments first sensor 351 is communicatively coupled to controller 323 via a wireless communications protocol (e.g., WLAN, Wi-Fi, BLUETOOTH, ZIGBEE, near field communication, combinations thereof and the like), in which case the first sensor signal may be communicated from first sensor 351 to controller 323 wirelessly.

Controller 323 is configured to control the position (i.e., set point) of the valve 327. In instances where CVS 305 is a pressure regulating valve system, controller 323 may be configured to set the position of valve 327 such that P2 at least substantially equals a target outlet fluid pressure (T). In that regard controller may be configured to determine P2 based at least in part on the first sensor signal provided by first sensor 351, and compare P2 to the target outlet fluid pressure T. When controller 309 determines that P3 does not at least substantially equal T, it may issue a control signal to actuator 325, wherein the control signal is configured to cause the actuator 325 to adjust a position of valve 327, e.g., such that P2 is adjusted upwards are downwards to at least substantially equals T. For example, if P2 is lower than T, controller 323 may send a control signal to actuator 325 that causes actuator 325 to move valve 327 to a more open position to increase the pressure P2 until it substantially equals T. Alternatively, if P2 is higher than T, controller 323 may send a control signal to actuator 325 that causes the actuator 325 to move valve 327 to a more closed position to decrease the pressure P2 until it substantially equals T.

Regardless of whether CVS is or is not a pressure regulating valve system, controller 323 may also be configured to perform water management operations consistent with the present disclosure. Pursuant to such operations, controller 323 may determine P2 from a sensor signal from first sensor 351, as discussed above. Controller 323 may then compare the determined pressure P2 to a low-pressure threshold LPT, wherein LPT is a pressure that is indicative of a leak upstream or downstream of CVS 305. In embodiments where CVS 305 is a pressure regulating valve system, the LPT may be a pressure value that is substantially less than the target pressure T, such as less than or equal to about 0.8*T, 0.7*T, 0.6*T, 0.5*T, 0.4*T, 0.3*T, or less. Without limitation, the LPT is preferably set low enough that P2 will not fall below LPT with a normal use of the water distribution network, such as during times of peak demand, when a fire suppression system (sprinklers, fire hydrants, etc.) is being used, or the like. In any case, when controller 323 determines that P2≤LPT, it may issue a control signal that causes actuator 325 to drive valve 327 to a fully closed (watertight) position, thereby preventing the flow of water through CVS 305. It should also be noted that the LPT will preferable be above a lower pressure that would require a water authority to report the low pressure to the Environmental Protection Agency and disinfect and flush the affected distribution system.

Figure 3C:
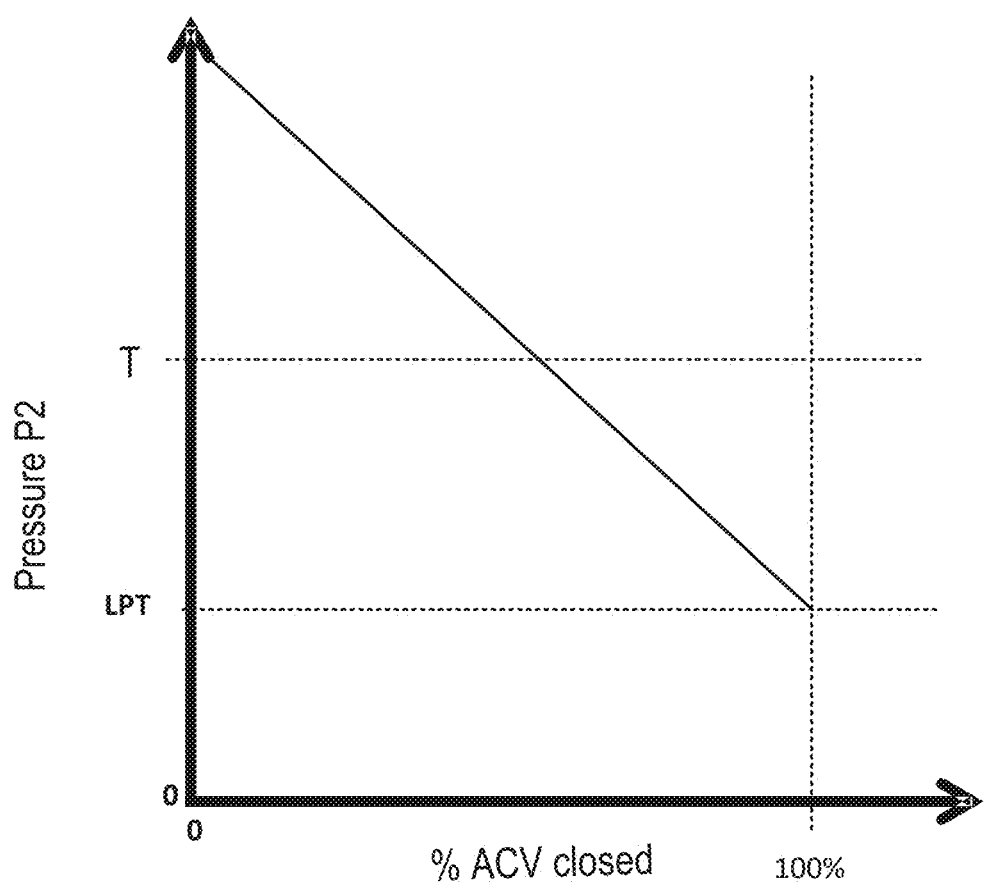
FIG. 3C is a plot of valve position (% ACV closed) versus pressure for an automatic control valve that implements low-pressure thresholding consistent with present disclosure.

To illustrate the foregoing concept reference is made to FIG. 3C, which is a plot of valved position (% ACV closed) versus pressure P2 for a control valve system consistent with the present disclosure. In this embodiment, the CVS is a pressure regulating valve system that (during normal operation) is configured to regulate the pressure P2 to a target pressure T as described above. That is, when P2>T, the controller 323 may cause actuator 325 to drive valve 327 to a more closed position to lower P2 until it substantially equals T. Similarly, when P2<T and P2>LPT, controller 323 may cause actuator 325 to drive valve 327 to a more open position to increase P2 until it substantially equals T. When P2≤LPT, however, controller 323 may cause actuator 325 to drive valve 327 to a fully closed (watertight) position, thereby preventing flow of water through CVS 305.

As noted above VA 321 may optionally include a limit switch 328. When used, limit switch 328 may function to indicate when valve 327 is in the fully open position or the fully closed position. Any suitable limit switch may be used as limit switch 328. Non-limiting examples of suitable limit switches that may be used as limit switch 328 include mechanical limit switches and electronic limit switches. Without limitation, in embodiments limit switch 328 is or includes an electronic limit switch that indicates the position of valve 327 with an electronic signal, such as but not limited to a resistant signal, a voltage signal, electrical conduction (or the absence thereof), combinations thereof, and the like. For example, the limit switch may be a Watts Series 51-1 Dual Limit Switch that provides visual indication of valve position, as well as remote electrical indication of "valve open" and "valve closed".

In embodiments controller 323 is configured to monitor sensor signals from first sensor 351 continuously or periodically, determine whether P2 is less than or equal to LPT, and optionally determine whether P2 is less than or equal to a target pressure T as described above. When P2≤LPT, controller 323 may issue control signals to the actuator 325 to cause actuator 325 to move valve 327 to the fully closed position as discussed above.

In embodiments CVS 305 includes more than one sensor. For example, and as shown in FIG. 3B, sensor(s) 350 may include a first sensor 351 (e.g., a pressure sensor) and optionally one or more second sensors 353. Optional second sensor(s) 353 may be configured to measure one or more additional characteristics of a fluid, e.g., within CVS 305, at an inlet of valve 327, at an outlet of valve 327, and/or downstream of an outlet valve 327. For example, in embodiments second sensor(s) 353 include one or more flow sensors that is/are configured to measure the flow rate of fluid through CVS 305 or, more specifically, through valve 327. In such instances the flow sensor(s) may produce a second sensor signal that is indicative of a detected flow rate of fluid (water) through VA 321, and may provide that second sensor signal to controller 323. In such instances controller 323 may determine a detected flow rate (DFR)\ from the second sensor signal and compare the detected flow rate to a high flow rate threshold (HFRT), wherein the HFRT is indicative of a leak or other uncontrolled flow condition. When controller 323 determines that DFR≥HFRT, it may issue a control signal to actuator 325 that causes actuator 325 to drive valve 327 to the fully closed (watertight) position. In that way, second sensor 353 may provide an alternative way of automatically closing valve 327 responsive to a leak or other uncontrolled flow event.

While second sensor 353 is independently useful to control the position of valve 327 responsive to a detected flow, the flow rate of water through CVS 305 may rapidly increase due to any number of normal operating events such as peak user demand, the operation of fire suppression equipment (fire hydrants, sprinkler systems, etc.), and the like. As a result, use of a high flow rate threshold alone to control the position of valve 327 could inadvertently lead to a situation where controller 323 causes actuator 325 to drive valve to the fully closed position at a time when the supply of water is to one or more outlets 109 is needed. Similarly, use of a low-pressure threshold alone (i.e., use of a first sensor for detecting pressure alone) could lead to a situation where a relatively slow leak from a portion of water distribution network remains undetected, resulting in the potential loss of copious amounts of water. With that in mind, in embodiments controller 323 is configured to use both a low-pressure threshold and a high flow rate threshold to determine whether valve 327 should be moved to the fully closed position. In such instances CVS 305 may include both a first sensor 351 and a second sensor 353, wherein the first sensor 351 is configured to detect a pressure P2 and the second sensor 353 is configured to detect a flow rate FR as described above, and/or provide corresponding first and second sensor signals to controller 323. In such instances controller 323 is configured to determine a detected pressure (P2) and a detected flow rate (DFR) from the first and second sensor signals, respectively. In addition, controller 323 is configured to compare P2 to a low-pressure threshold ("LPT") and to compare DFR to a high flow rate threshold (HFRT). When P2≤LPT and DFR≥HFRT, controller 323 may issue a control signal to actuator 325, wherein the control signal causes actuator 325 to drive valve 327 to a fully closed position.

For simplicity FIG. 3A depicts a water supply system 300 as including a single CVS 305. Multiple CVSs may be used, however, and in such instances each CVS may be configured in the same manner as described above concerning CVS 305. When multiple CVS's are used, they may include a pressure sensor that detects a pressure (DP1, DP2, DP3, etc.), e.g., proximate an outlet side of their respective valves, issues corresponding sensor signals to their respective controllers. Their controllers may determine the detected pressure (DP1, DP2, etc.) based at least in part on the sensor signals and compare the detected pressure to a corresponding low pressure threshold (e.g., LPT1, LPT2, LPT3, etc. which may be the same or different). When the detected pressure is≤the relevant LPT, the controller may issue a control signal to move the valve of the CVS to a fully closed position. Each controller may also compare the detected pressure to a target pressure (T1, T2, T3, etc., which may be the same or different), e.g., when the detected pressure is greater than the relevant LPT. If the detected pressure is not substantially equal to the target pressure but the detected pressure is greater than the relevant LPT, the controller may issue a control signal to cause the actuator of the CVS to move reposition the valve to increase or decrease the detected pressure accordingly.

Figure 4:
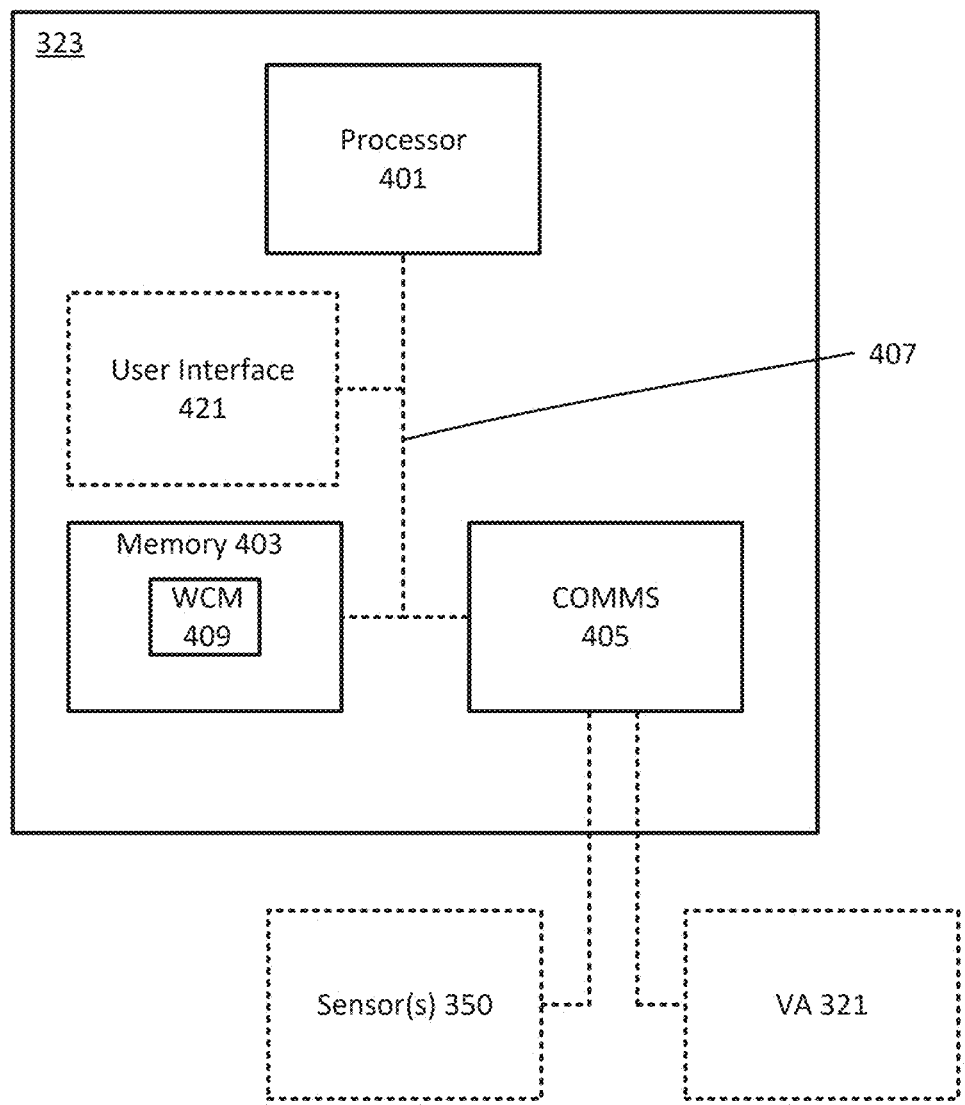
FIG. 4 is a block diagram of one example of a controller for a control valve system consistent with the present disclosure

FIG. 4. is a block diagram of one example of a controller 323 that may be used in accordance with the present disclosure. Controller 323 includes a processor 401, memory 403, and communications circuitry (COMMS) 405, which are communicatively coupled to one another via a bus 407. Controller 323 may optionally further include a user interface 421. When present, user interface 421 may be configured to permit a user to interact with controller 323, e.g., to set a desired target outlet pressure T, a desired low-pressure threshold (LPT), and/or a desired high flow rate threshold (HFRT).

Processor 401 may be any suitable general-purpose processor or application specific integrated circuit. Without limitation, in embodiments processor 401 is one or more single or multicore processors produced by INTEL® corporation, APPLE® corporation, AMD® corporation, SAMSUNG® corporation, NVIDIA® corporation, Advanced Risc Machines (ARM®) corporation, combinations thereof, or the like. While FIG. 4 depicts the use of a single processor 401, multiple processors can be used.

Memory 403 may be any suitable type of computer readable memory. Examples of memory types that may be used as memory 403 include but are not limited to: programmable memory, non-volatile memory, read only memory, electrically programmable memory, random access memory, flash memory (which may include, for example NAND or NOR type memory structures), magnetic disk memory, optical disk memory, phase change memory, memristor memory technology, spin torque transfer memory, combinations thereof, and the like. Additionally, or alternatively, memory 403 may include other and/or later-developed types of computer-readable memory.

COMMS 405 may include hardware (i.e., circuitry), software, or a combination of hardware and software that is configured to allow system controller 423 to transmit and receive messages via wired and/or wireless communication to/from one or more external devices such as but not limited to sensors 350 and actuator 325, as discussed above. Communication between COMMS 405 and such devices may occur, for example, over a wired or wireless connection using one or more currently known or future developed communication standards. COMMS 405 may include hardware to support such communication, e.g., one or more transponders, antennas, BLUETOOTH™ chips, personal area network chips, near field communication chips, wired and/or wireless network interface circuitry, combinations thereof, and the like. In embodiments COMMS 405 is communicatively coupled with at least first sensor 451 and at least actuator 425, as discussed previously. In such a state, controller 323 is configured to receive first sensor signals from first sensor 451, and to transmit one or more control signals to actuator 425 as discussed above. COMMS 405 may also optionally be configured to transmit one or more notification messages (e.g., via wired and/or wireless communication) that are designed to notify manager or maintenance personnel when valve 327 is moved to a fully closed position (e.g., responsive to a determination that P2≤LPT).

Controller 323 further includes a water control module (WCM) 409. In this specific context, the term "module" refers to software, firmware, circuitry, and/or combinations thereof that is/are configured to perform one or more water management operations consistent with the present disclosure. Software may be embodied as a software package, code, instructions, instruction sets and/or data recorded on non-transitory computer readable storage mediums. Firmware may be embodied as code, instructions or instruction sets and/or data that are hard-coded (e.g., nonvolatile) in controller 323, e.g., within memory 403 or other storage. In embodiments, WCM 409 is in the form of logic that is implemented at least in part in hardware to perform water management operations consistent with the present disclosure.

For example, WCM 409 may be configured to cause controller 423 to determine a pressure P2 from a first control signal received from a first pressure sensor 451, and to determine whether P2 is less than or equal to a low-pressure threshold LPT as discussed above. When P2≤LPT, WCM 409 may cause controller 423 to issue one or more control signals to actuator 425, wherein the control signal is configured to cause actuator 425 to move valve 427 to a fully closed position. WCM 409 may also be configured to receive additional sensor signals (e.g., a second sensor signal from optional second sensor 353) as discussed above. In such instances WCM 409 may cause controller 323 to determine a detected flow rate (DFR) based at least in part on the second sensor signals and compare the DFR to a high flow rate threshold as discussed above.

Figure 5:
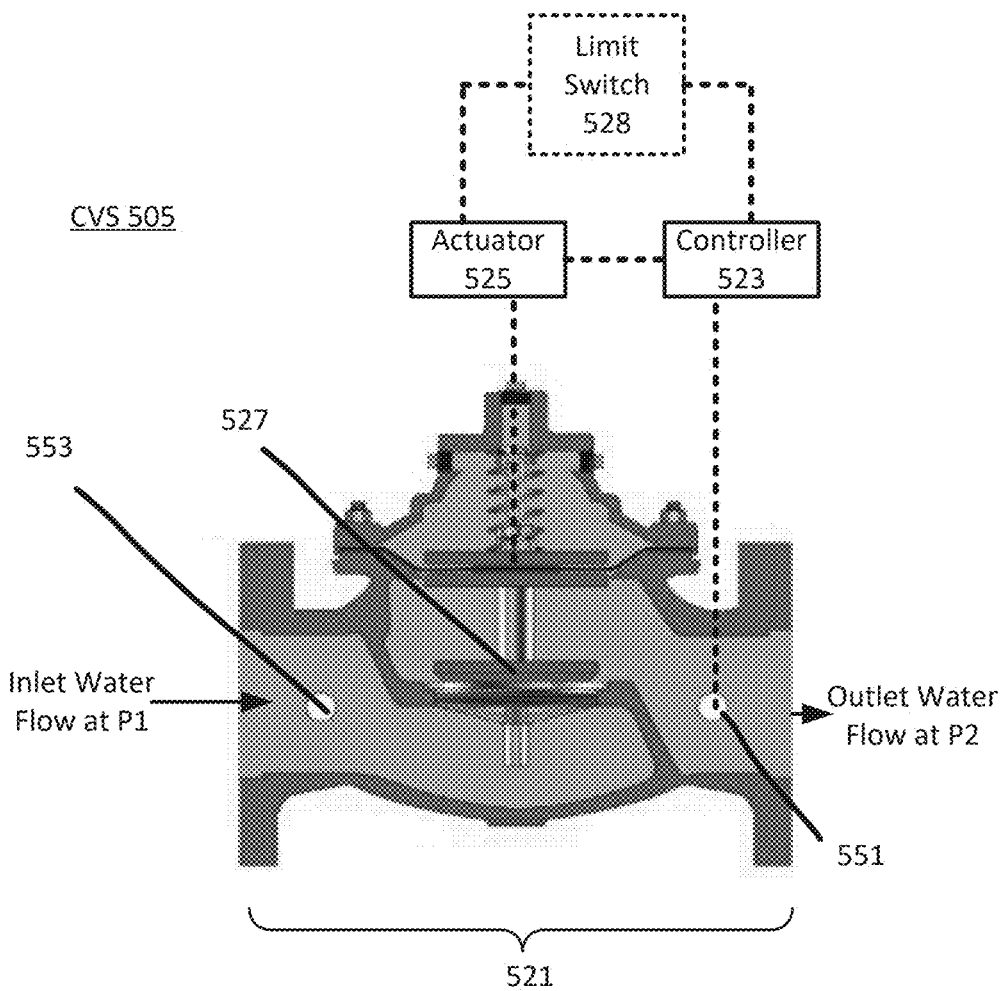
FIG. 5 is a schematic drawing of another example of a control valve system consistent with the present disclosure.

FIG. 5 depicts another example of control valve system (CVS) that can be used in a water control system for a water distribution network consistent with the present disclosure. Apart from the specific configuration shown in FIG. 5, the nature and function of CVS 505 is the same as described above in connection with CVS 305 in FIG. 3B and so will not be reiterated in detail. With that in mind, CVS 505 includes a valve assembly 521 in the form of an automatic control valve (ACV) that includes an inlet and an outlet. The inlet of the ACV is configured to fluidly couple to a water supply (e.g., a municipal water supply) and to receive water at an inlet pressure P1. The ACV is configured to discharge water from the outlet at an outlet pressure P2. The ACV includes an actuator 525, a valve 527, an optional limit switch 528, and a controller 523—the nature and function of which are the same as described above in connection with actuator 325, valve 327, optional limit switch 328, and controller 323. Consistent with the discussion of FIG. 3B, actuator 525 is generally configured to control a position of valve 527, e.g., in response to a control signal from controller 523. More specifically, actuator 525 may incrementally position valve 527 between a fully open and a fully closed position in response to a control signal from controller 523. In embodiments actuator 525 is or includes a proportional solenoid, but any other type of actuator may be used.

CVS 505 further includes a pressure sensor 551 and optionally may include a flow sensor 553. The nature and function of the pressure sensor 551 and optional flow sensor 553 are the same as described above regarding CVS 305, first sensor 351, and optional second sensor 353. Like first sensor 351, pressure sensor 551 is configured to communicatively couple with controller 523, and to measure P2 corresponding to the outlet fluid pressure of CVS 505. In the embodiment of FIG. 5 pressure sensor 551 is installed at a downstream side of valve 527, but it may be located elsewhere. In any case, pressure sensor 551 is configured to detect P2 and generate a first sensor signal indicative of P2 in the same manner as described above regarding first sensor 351. The first sensor signal may be conveyed to controller 523 in any suitable manner, such as via wired or wireless communication. When used, optional flow sensor 553 is configured to measure the fluid flow rate through CVS 505 and provide a second sensor signal indicative of the detected fluid flow rate to controller 523 in any suitable manner, such as via wired or wireless communication.

Like controller 323, controller 523 is configured to determine P2 based at least in part on the first control signal, and to compare P2 to a low-pressure threshold (LPT). When P2 is less than or equal to the LPT, controller 523 may issue a control signal that is configured to cause actuator 525 to drive valve 527 to the fully closed position. When optional second sensor 353 is used, controller 523 may also optionally determine the flow rate of fluid through CVS 505 and compare the detected flow rate to a high flow rate threshold (HFRT) as described above re: second sensor 353. If the detected flow rate is greater than or equal to the HFRT (either alone or in combination with a pressure P2 at or below the LPT), controller 523 may issue a control signal that causes actuator 525 to drive valve 527 to the fully closed position. Controller 523 may verify that valve 527 is in the fully closed position in any suitable manner. For example, when CVS 505 includes optional limit switch 528, controller 523 may verify whether valve 527 is or is not in a fully closed position based at least in part on a position of limit switch 528 and/or a signal from limit switch 528.

In the embodiment of FIG. 5 actuator 525 is shown as part of VA 521. While useful, such a configuration is not required and VA 521 and actuator 525 may be configured differently. For example, actuator 525 may be separate from VA 521, but configured to move valve 527 within VA 521 in response to a control signal as explained above. A plurality of actuators 525 may also be used, e.g., to move one or a plurality of valves 527.

Consistent with the description of FIGS. 3A-3C, controller 523 may issue a control signal to actuator 525 in response to a determination that P2 is greater than a low-pressure threshold (LPT), but does not substantially equal a target pressure T. Like CVS 305, controller 523 may configure its control signal such that actuator 525 moves valve 527 to increase or decrease P2 until P2 at least substantially equals T, provided that P2 is greater than the LPT. In that regard, controller 523 may monitor P2 to determine whether it substantially equals T following the issuance of a (first) control signal. If not, controller 523 may issue another (i.e., a second) control signal to actuator 525, causing actuator 525 to further adjust the position of valve 527 with a corresponding impact on P2. In that way, controller 523 may continuously or periodically adjust the position of valve 527 such that P2 remains at least substantially equal to T, even when operational characteristics of CVS 505, e.g., due to inlet pressure (P1) fluctuations, the development of a leak, etc. In any case, if controller 523 determines that P2≤LPT, it may issue a control signal that causes actuator 525 to drive valve 527 to the fully closed position.

As described above, the control valve systems consistent with the present disclosure can automatically move a valve therein to a fully closed position responsive to the detection of a particular flow condition, such as a water pressure at or below a low-pressure threshold, and water flow at or above a high flow rate threshold, or a combination thereof. Such systems have utility for isolating all or a portion of a water distribution network responsive to the detected flow condition. For example, and as will be described in detail below, multiple control valve systems consistent with the present disclosure can be deployed at various points in a water distribution network. When an event that affects the flow of water in the system occurs (e.g., a leak, a burst pipe, or the like), the sensor(s) in control valve systems upstream and downstream of the event may detect the occurrence of that event, e.g., by determining an outlet pressure is at or below a low-pressure threshold and/or a flow rate is at or above a high flow rate threshold. In such instances, the control valve systems upstream and downstream of the event may automatically move to a fully closed position, isolating the region of the water distribution network affected by the event.

Figure 6:
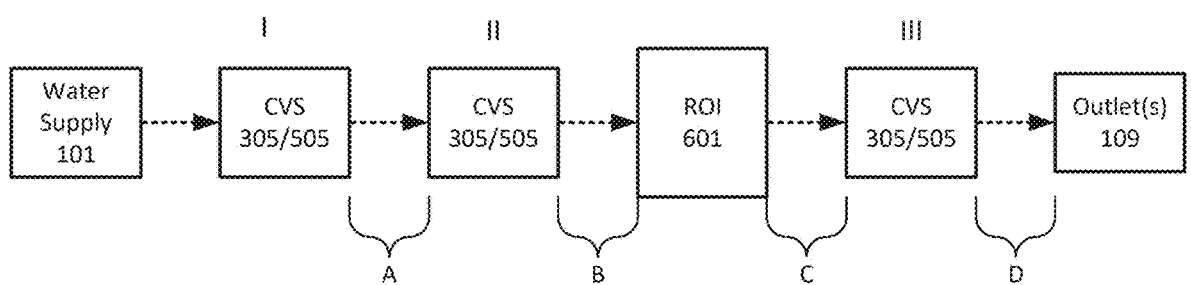
FIG. 6 illustrates another non-limiting example of a water distribution network consistent with the present disclosure.

To illustrate this concept reference is made to FIGS. 6, which schematically illustrates one example of a water distribution network 600 consistent with the present disclosure. For simplicity water distribution network 600 is show as including three control valve systems (CVS) 305/505 and a single region of interest (ROI) 601, which are fluidly coupled to a water supply 101 and one or more outlets 109. The number of CVS' is not limited to three, and any suitable number of CVS' may be used. The number of ROIs is also not limited to one, and multiple ROIs may be used.

In the embodiment of FIG. 6, each CVS 305/505 is configured in the same manner as described above in connection with FIG. 3A, 3B, or 5, and so their individual operation will not be re-described in detail. For the sake of illustration, the following discussion will focus on embodiments in which each CVS 305/505 includes a single sensor in the form of a pressure sensor, but as noted above multiple sensors (e.g., pressure and flow) may be used. ROI 601 in such embodiments may be any area or feature of interest in a water distribution network, such as but not limited to a treatment plant, a water storage tank or other reservoir, combinations thereof, and the like. For discussion purposes, the following description will focus on scenarios and embodiments in which ROI 601 is a water storage tank. In such scenarios the different CVS 305's in FIG. 6 will be referred to as CVS I, CVS II, and CVI III (as labeled in the figure) for ease of reference.

Scenario 1: In a first scenario a supply line in water distribution network 600 breaks between CVS I and CVS II, i.e., in region A in FIG. 6. The break causes a drop in water pressure, which is detected by the pressure sensors of CVS I and CVS II. When the detected water pressure (P2) drops to or below a low pressure threshold (LPT) both CVS I and CVS 2 move to a fully closed position, isolating region A from the water distribution network. The closure of CVS I prevents the introduction of water into region A from water supply 101, and the closure of CVS II prevents backflow of water from ROI 601, which in this case is a water tank. When they close, CVS I and CVS II (or more specifically, the controllers thereof) may also optionally issue a notification message (e.g., via wired or wireless communication) that is designed to notify maintenance staff of their closure. CVS I and CVS II preferably remain closed until they are manually reset, e.g., following repair of the break. In that way, CVS I and CVS II may automatically and independently isolate region A from water distribution network 600.

Scenario 2: In a second scenario a supply line in water distribution network 600 breaks between CVS II and ROI 601 (i.e., in region B of FIG. 6), which as noted above in this case is a water storage tank. When the break occurs, CVS I and CVS II will both detect a drop in pressure (P2). When the pressure detected by CVS I and CVS II drops below a low pressure threshold (LPT), CVS I and II will move to a fully closed position—isolating the break point from water supply 101 and preventing potentially back flow of water from the ROI 601 (water storage tank) into water supply 101. Because the break occurred upstream of the water storage tank and downstream of CVS II, CVS III may not initially detect a drop in pressure as the pressure it detects may initially be maintained by the water contained in ROI 601. As the water contained in ROI 601 flows out of the break, however, the pressure sensor in CVS III will detect a drop in pressure. When the pressure detected by CVS III drops below the LPT, CVS III will move to a fully closed position, isolating (with CVS II) the break, ROI 601, and region C of the water distribution network 600 from potential backflow from the part of the water distribution network downstream of CVS III. When they close, CVS I, II, and III (or more specifically, the controllers thereof) may also optionally issue a notification message (e.g., via wired or wireless communication) that is designed to notify maintenance staff of their closure. CVS I, II and III preferably remain closed until they are manually reset, e.g., following repair of the break. In that way, CVS I, CVS II, and CVS III may automatically and independently isolate region B, region C, and ROI 601 from water distribution network 600.

Scenario 3: In a third scenario a supply line in water distribution network 600 breaks between ROI 601 and CVS III (i.e., in region C of FIG. 6). When the break occurs, CVS III will all detect a drop in water pressure (P2). CVS I and II may also detect a drop in pressure immediately, or such detection may be delayed due to the backpressure provided by ROI 601 when it is full. As the water in ROI 601 flows through the break, however, the pressure detected by CVS I and II will also drop. When the pressure P2 detected by CVS I, 11, and III drops below a low pressure threshold (LPT), CVS I, II and III will move to a fully closed position—isolating the break point from water supply 101 and limiting water loss to the water in ROI 601 (which as noted previously may flow through the break in region C). When they close, CVS I, II, and III (or more specifically, the controllers thereof) may also optionally issue a notification message (e.g., via wired or wireless communication) that is designed to notify maintenance staff of the CVS closure. CVS I, II and III preferably remain closed until they are manually reset, e.g., following repair of the break. In that way, CVS I, CVS II, and CVS III may automatically and independently isolate region B, region C, and ROI 601 from water distribution network 600.

Scenario 4: In a fourth scenario a supply line in water distribution network 600 breaks between and CVS III and outlets 109 (i.e., in region D of FIG. 6). In this scenario, outlets 109 could be a branch of water network 600 that is protected by CVS 305. When the break occurs, CVS III will all detect a drop in water pressure (P2). CVS I and II may also detect a drop in pressure, but that drop may be mitigated by the backpressure provided by water in ROI 601. When the pressure P2 detected by CVS III drops below a low pressure threshold (LPT), CVS III will move to a fully closed position—isolating the break point from water supply 101 and ROI 601. It will also limit water loss to water that may be in region D by preventing further flow of water towards outlets 109 from ROI 601 and water supply 101.

Figure 7:
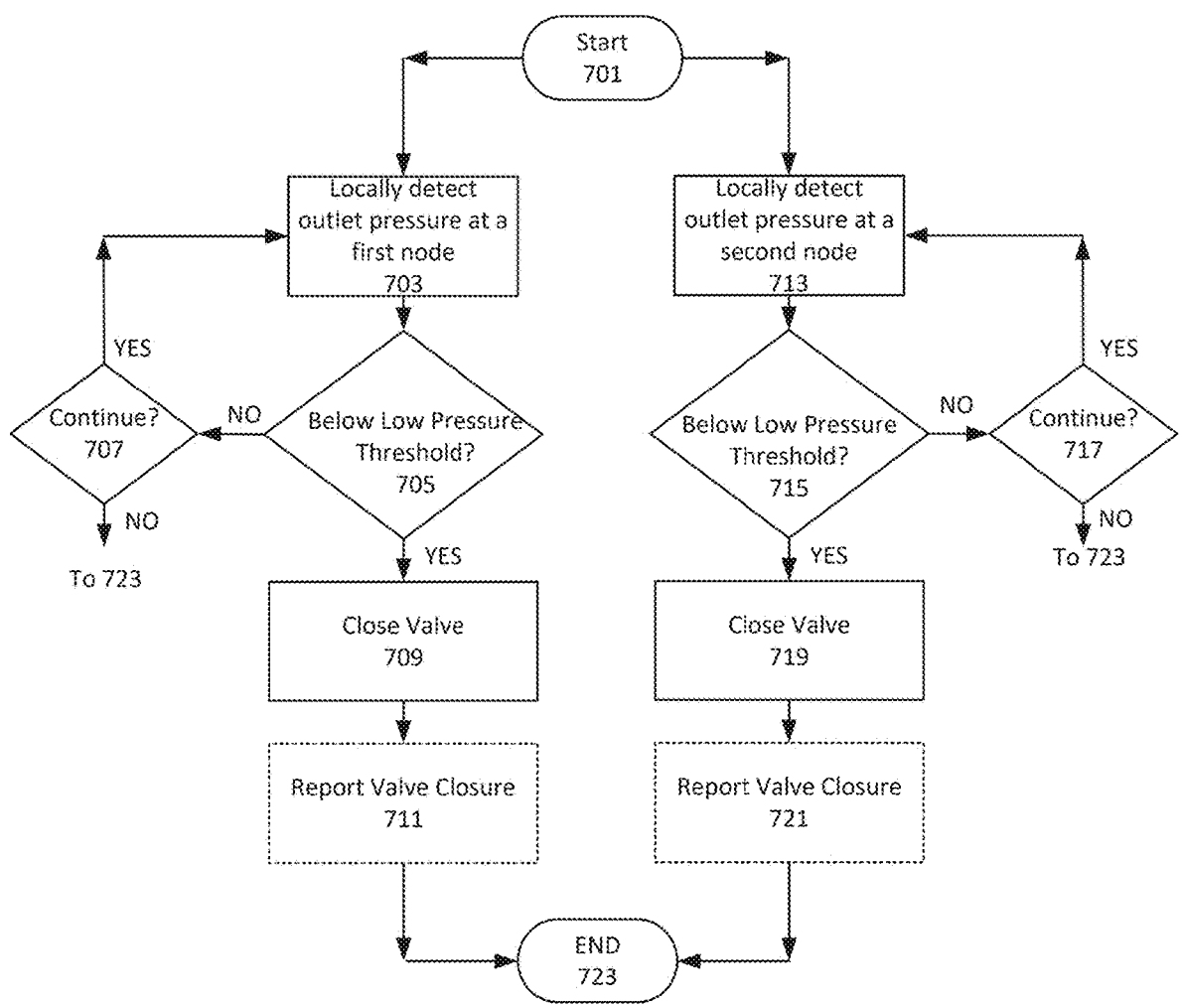
FIG. 7 is a flow diagram of one example of a method of isolating a region of a water distribution network consistent with the present disclosure.

Reference is now made to FIG. 7, which is a flow diagram of one example of a method of isolating one or more regions of a water distribution network consistent with the present disclosure. For simplicity, the method will be described based on a water distribution network in which two control valve systems (CVS I and CVS II) consistent with the present disclosure are installed at a first node and a second node of a water distribution network, wherein the first node is upstream of the second node. Any number of control valve systems may be used, however, and they may be positioned at any suitable location in a water distribution network. As used herein, the term "node" is used to denote a position in a water distribution network, and may correspond to a region of interest, a branch point in the water distribution network, a point along one or more supply or distribution lines, combinations thereof, and the like.

As shown, method 700 begins at block 701. The method then proceeds along two branches, each of which is executed by one of a plurality of control valve systems (CVS) consistent with the present disclosure. In the illustrated embodiment two CVSs are used, and so the method includes two branches—a first branch beginning with block 703 and executed by a first CVS, and a second branch beginning at block 713 and executed by a second CVS. If an additional (e.g., third) CVS is used, an additional (third) branch with identical steps to those show in FIG. 7 would be added to the method and performed by the additional (third) CVS.

Pursuant to block 703, a first CVS consistent with the present disclosure will locally detect the outlet pressure (P2) at a first node within the water distribution network. Independently of the operations pursuant to block 703, pursuant to block 713 a second CVS consistent with the present disclosure will locally detect the outlet pressure (P2) at a second node within the water distribution network. As used herein, "locally detect" means that the CVS will sense a flow condition (e.g., pressure, flow, or the like) at a point proximate the CVS, such as at the outlet of the CVS as noted above. The first and second CVS may locally detect the pressure P2 at their respective first and second nodes, e.g., with respective first and second pressure sensors as described above.

The method may proceed from block 703 to block 705 and—independently—from block 713 to block 715. Pursuant to blocks 705 and 715, the first and second CVS' (or, more specifically, their respective controllers) may compare P2 detected at their respective first and second nodes to a low pressure threshold (LPT). The LPT used at the first and second nodes may be the same or different and is preferably the same. The first and second CVS" will then determine whether P2 is less than or equal to their respective LPT. If not, the method may proceed from block 705 to block 707 and—independently—from block 715 to block 717. Pursuant to blocks 707 and 717, the first and second CVS' may independently determine whether the method is to continue. If not, the method may proceed to block 723 and end. But if so, the method may loop back to blocks 703 and 713 and monitoring of P2 by the first and second CVS may continue.

Returning to block 705, if the first CVS determines that P2 at the first node is less than or equal to the LPT, the method may proceed to block 709 and the valve within the first CVS is moved to a fully closed position. The method may then proceed to optional block 711, pursuant to which the first CVS may optionally report the closure of its valve (e.g., responsive to a low pressure event) via wired or wireless communication. The second CVS may independently perform similar operations. That is, pursuant to block 715 if the second CVS determines that P2 at the second node is less than or equal to the LPT, the method may proceed to block 719 and the valve within the second CVS is moved to a fully closed position. The method may then proceed to optional block 721, pursuant to which the second CVS may optionally report the closure of its valve (e.g., responsive to a low pressure event) via wired or wireless communication. The method may then proceed from optional block 711, or optional block 721 to block 723 and end.

As used herein the phrase "at least substantially" when used in connection with a value or ranges, means+/−10% (e.g., +/−5%) of the indicated value or the endpoints of the indicated range.

EXAMPLE

Figure 8:
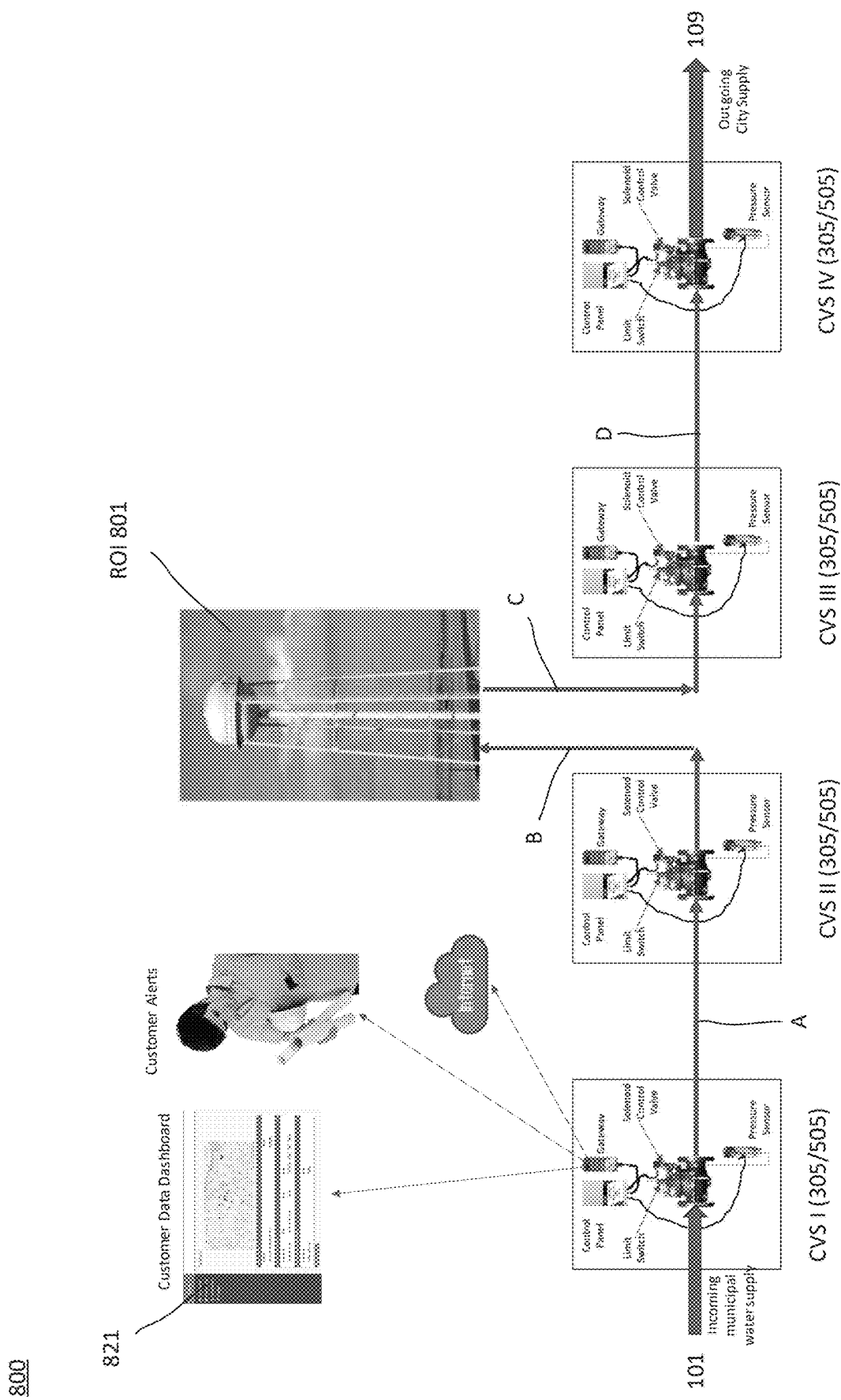
FIG. 8 illustrates another non-limiting example of a water distribution network consistent with the present disclosure.
Figure 9:
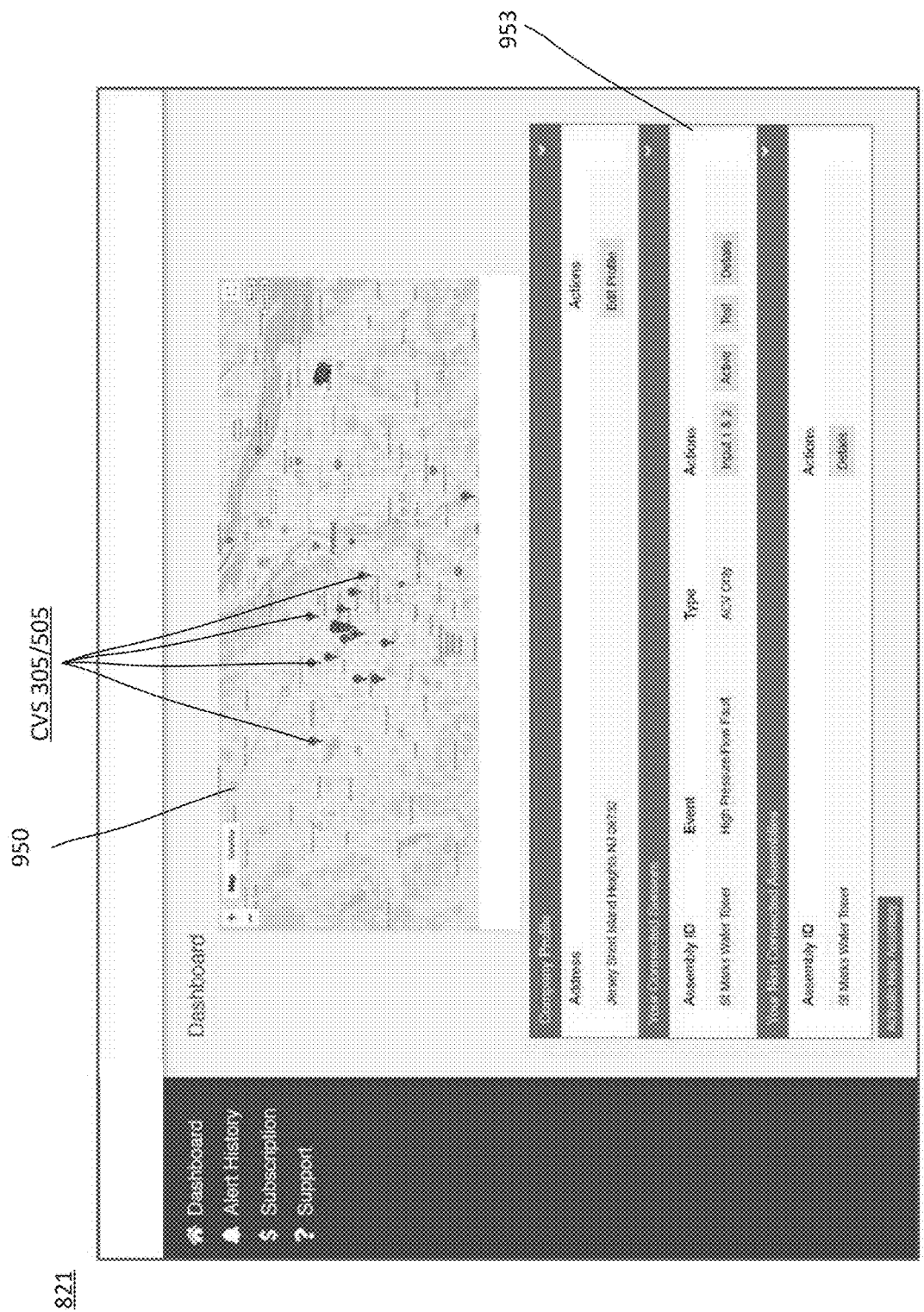
FIG. 9 depicts one example of a user interface for a system for isolating one or more regions of a water distribution network consistent with the present disclosure.

The following example is provided to further illustrate the operation of various aspects of the technologies of the present disclosure. In that regard reference is made to FIG. 8, which is a diagram of one example of a water supply system (e.g., a water distribution network) that includes a plurality of control valve systems consistent with the present disclosure. As shown, system 800 includes a water source 101 that is fluidly coupled to a first CVS 305/505 (hereinafter CVS I) via one or more supply lines. A second CVS 305/505 (hereinafter, CVS II) is fluidly coupled downstream of CVS I via one or more lines. CVS II is upstream of and fluidly coupled to a ROI 801, which in this case is a water storage tank. ROI 801 is fluidly coupled to a third CVS 305/505 (hereinafter, CVS III) by one or more distribution lines, such that CVS III is downstream of ROI 801. A fourth CVS 305/505 (hereinafter CVS IV) is fluidly coupled downstream to CVS III by one or more distribution lines and is upstream of and fluidly coupled to one or more outlets 109 via one or more distribution lines. Like the system 600, system 800 is illustrated with four control valve systems and one region of interest, but any suitable number of control valve systems and regions of interest may be used. As each of CVS I-CVS IV is configured in the same manner as CVS 305 or CVS 505 and include a controller consistent with controller 323, their nature and configuration is not described again in the interest of brevity. In this example, each of CVS I-CVS 4 is configured to provide status messages to a user interface 821 (e.g., a customer data dashboard), wherein the status messages cause the user interface to notify a user of the status of one or more CVS I-CVS IV. In particular, the status message may cause the user interface 821 to display an alert that is configured to notify a user when one or more of CVS I-CVS IV is in a fully closed position. As shown in FIG. 9, user interface 821 may include a display that is configured to display a map that includes a graphical representation of the position of each CVS 305/505 in the water distribution network, and a status panel 953 that is configured to display status messages indicating an operational status of one or more of the CVS 305/500 in the water distribution network.

For discussion purposes several scenarios will be described to illustrate the operation of CVS 305/505 and user interface under various operational conditions.

Scenario 1: In a first scenario water flows normally through water distribution network 800, and no breaks or leaks are present in any of the distribution lines and supply lines thereof. In such instances, the controllers in each of CVS I-CVS IV may cause the issuance of one or more status messages to user interface 821, which may be an application executing on a mobile device, a desktop computer, a server, or the like. The status messages may be transmitted via wired or wireless communication, directly or via one or more communications networks such as the internet, a cellular network, a local area network, or the like. In this scenario, the status messages may be configured to cause the user interface to display the status of each of CVS I, II, III, IV, e.g., as operating normally and being in an at least partially open condition. The status messages in some embodiments may cause the user interface 821 to display the degree to which the valve in each CVS is open, e.g., as a percentage, within status panel 953 or at another location.

Scenario 2: In a second scenario a supply line in water distribution network 800 breaks between CVS I and CVS II, i.e., in region A in FIG. 8. The break causes a drop in water pressure, which is detected by the pressure sensors of CVS I and CVS II. When the detected water pressure (P2) drops to or below a low pressure threshold (LPT) both CVS I and CVS 2 move to a fully closed position, isolating region A from the water distribution network. The closure of CVS I prevents the introduction of water into region A from water supply 101, and the closure of CVS II prevents backflow of water from ROI 801, which in this case is a water tank. When they close, CVS I and CVS II (or more specifically, the controllers thereof) may optionally issue a status message that is designed to cause user interface 821 to indicate that CVS I and CVS II have moved to a fully closed position. This may notify maintenance staff of the closure of CVS I and II, which preferably remain closed until they are manually reset, e.g., following repair of the break. In that way, CVS I and CVS II may automatically and independently isolate region A from water distribution network 800.

Scenario 3: In a third scenario a supply line in water distribution network 800 breaks between CVS II and ROI 801 (i.e., in region B of FIG. 8). When the break occurs, CVS I and CVS II will both detect a drop in pressure (P2). When the pressure detected by CVS I and CVS II drops below a low pressure threshold (LPT), CVS I and II will move to a fully closed position—isolating the break point from water supply 101 and preventing potentially back flow of water from the ROI 801 into water supply 101. Because the break occurred upstream of the water storage tank and downstream of CVS II, CVS III may not initially detect a drop in pressure as the pressure it detects may initially be maintained by the water contained in ROI 801. As the water contained in ROI 801 flows out of the break, however, the pressure sensor in CVS III will detect a drop in pressure. When the pressure detected by CVS III drops below the LPT, CVS III will move to a fully closed position, isolating (with CVS II) the break, ROI 801, and region C of the water distribution network 800 from potential backflow from the part of the water distribution network downstream of CVS III. When they close, CVS I, II, and III (or more specifically, the controllers thereof) may also optionally issue a status message configured to cause user interface 821 to indicate that CVS I, II, and II are in the fully closed position. CVS I, II and III preferably remain closed until they are manually reset, e.g., following repair of the break. In that way, CVS I, CVS II, and CVS III may automatically and independently isolate region B, region C, and ROI 801 from water distribution network 800.

Scenario 4: In a fourth scenario a supply line in water distribution network 800 breaks between ROI 801 and CVS III (i.e., in region C of FIG. 8). When the break occurs, CVS III will all detect a drop in water pressure (P2). CVS I and II may also detect a drop in pressure immediately, or such detection may be delayed due to the backpressure provided by ROI 801 when it is full. As the water in ROI 801 flows through the break, however, the pressure detected by CVS I and II will also drop. When the pressure P2 detected by CVS I, II, and III drops below a low pressure threshold (LPT), CVS I, II and III will move to a fully closed position—isolating the break point from water supply 101 and limiting water loss to the water in ROI 801 (which as noted previously may flow through the break in region C). When they close, CVS I, II, and III (or more specifically, the controllers thereof) may also optionally issue a status message that is configured to cause user interface 821 to indicate that CVS I, II, and III are in the fully closed position. CVS I, II and III preferably remain closed until they are manually reset, e.g., following repair of the break. In that way, CVS I, CVS II, and CVS III may automatically and independently isolate region B, region C, and ROI 801 from water distribution network 800.

Scenario 5: In a fifth scenario a supply line in water distribution network 800 breaks between and CVS III and CVS IV (i.e., in region D of FIG. 6). When the break occurs, CVS III and IV will detect a drop in water pressure (P2). CVS I and II may also detect a drop in pressure, but that drop may be mitigated by the backpressure provided by water in ROI 801. When the pressure P2 detected by CVS III and IV drops below a low pressure threshold (LPT), CVS III and IV will move to a fully closed position—isolating the break point from water supply 101 and ROI 801. It will also limit water loss to water that may be in region D by preventing further flow of water towards outlets 109 from ROI 801 and water supply 101. When they close, CVS III and IV (or more specifically, the controllers thereof) may also optionally issue a status message that is configured to cause user interface 821 to indicate that CVS III and IV are in the fully closed position. CVS III and IV preferably remain closed until they are manually reset, e.g., following repair of the break. In that way, CVS III and IV may automatically and independently isolate region D from the water distribution network 800.

"Circuitry," as used in any embodiment herein, may comprise, for example, singly or in any combination, hard-wired circuitry, programmable circuitry such as computer processors comprising one or more individual instruction processing cores, data machine circuitry, software and/or firmware that stores instructions executed by programmable circuitry.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the features, structures, or characteristics nay be combined in any suitable manner in one or more embodiments.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:
1. A method for isolating a region of interest (ROI) in a water distribution network, comprising:
    detecting a water pressure PD1 upstream of the ROI and generating a first sensor signal indicative of PD1 with a first pressure sensor, the first pressure sensor installed in a downstream side of a first control valve system (CVS), the first CVS comprising a first inlet, a first outlet, a first valve disposed between the first inlet and first outlet that is movable between an open position and a fully closed position, and a first controller that is configured to control a position of the first valve responsive to PD1;
    detecting a water pressure PD2 downstream of the ROI with a second pressure sensor and generating a second sensor signal indicative of PD2, the second pressure sensor installed in a downstream side of a second control valve system (CVS), the second CVS comprising a second inlet, a second outlet, a second valve disposed between the second inlet and second outlet that is movable between an open position and a fully closed position, and a second controller configured to control a position of the second valve responsive to

PD2, where the second inlet is disposed downstream of the first outlet and the ROI is disposed between the first CVS and second CVS;

determining, with the first controller, the pressure PD1 based at least in part on the first sensor signal and comparing PD1 to a first low pressure threshold LPT1;

causing, with the first controller, the first valve to move to the fully closed position when PD1≤LPT1;

determining, with the second controller, the pressure PD2 based at least in part on the second sensor signal and comparing PD2 to a second low pressure threshold LPT2; and causing, with the second controller, the second valve to move to the fully closed position when PD2≤LPT2.

2. The method of claim 1, wherein the first CVS and second CVS are each fluidly coupled to a water supply and to one or more outlets.

3. The method of claim 2, wherein the ROI is a water storage tank.

4. The method of claim 1, wherein the first CVS and second CVS each include an automatic control valve.

5. The method of claim 1, further comprising:
causing, with the first controller, issuance of a first notification message when the first valve is moved to the fully closed position; and
causing, with the second controller, the issuance of a second notification message when the second valve is moved to the fully closed position.

6. The method of claim 1, further comprising:
detecting a water pressure PD3 downstream of the first CVS but upstream of the ROI with a third pressure sensor and generating a third sensor signal indicative of PD3, the third pressure sensor installed in a downstream side of a third control valve system (CVS), the third CVS comprising a third valve that is movable between an open position and a fully closed position and a third controller configured to control a position of the third valve responsive to PD3;
determining, with the third controller, the pressure PD3 based at least in part on the third sensor signal and comparing PD3 to a third low pressure threshold LPT3; and
causing, with the third controller, the third valve to move to the fully closed position when PD3≤LPT3.

7. The method of claim 6, wherein the ROI is a water storage tank.

8. The method of claim 6, wherein the first CVS, second CVS, and third CVS each include an automatic control valve.

9. The method of claim 1, further comprising:
comparing, with the first controller, PD1 to a first target pressure T1 when PD1>LPT1, and causing position of the first valve to change when PD1 does not at least substantially equal T1; and
comparing, with the second controller, PD2 to a second target pressure T2 when PD2>LPT2, and causing position of the second valve to change when PD2 does not at least substantially equal T2.

10. A water supply system, comprising:
a first control valve system (CVS) fluidly coupled to a water supply;
a second control valve system (CVS) fluidly coupled to at least one outlet of the water supply system;
a region of interest (ROI) fluidly coupled to the first CVS and the second CVS, such that the first CVS is upstream of the ROI and the second CVS is downstream of the ROI;

wherein:
the first CVS comprises:
a first inlet;
a first outlet;
a first pressure sensor installed in a downstream side of the first CVS, the first pressure sensor configured to detect a water pressure PD1 upstream of the ROI and generate a first sensor signal indicative of PD1;
a first valve disposed between the first inlet and first outlet, the first valve movable between an open position and a fully closed position; and
a first controller that is configured to control a position of the first valve responsive to PD1;
the second CVS comprises:
a second inlet;
a second outlet, where the second inlet is disposed downstream of the first outlet;
a second pressure sensor installed in a downstream side of the second CVS, the second pressure sensor configured to detect a water pressure PD2 downstream of the ROI and generate a second sensor signal indicative of PD2;
a second valve disposed between the second inlet and second outlet, the second valve movable between an open position and a fully closed position; and
a second controller that is configured to control a position of the second valve responsive to PD2;
the first controller is configured to:
determine PD1 based at least in part on the first sensor signal;
compare PD1 to a first low pressure threshold LPT1; and
cause the first valve to move to the fully closed position when PD1≤LPT1; and
the second controller is configured to:
determine the pressure PD2 based at least in part on the second sensor signal;
compare PD2 to a second low pressure threshold LPT2; and
cause the second valve to move to the fully closed position when PD2≤LPT2.

11. The system of claim 10, wherein the ROI is a water storage tank.

12. The system of claim 10, wherein the first CVS and second CVS each include an automatic control valve.

13. The system of claim 10, wherein:
the first controller is configured to issue a first notification message when the first valve is moved to the fully closed position; and
the second controller is configured to issue a second notification message when the second valve is moved to the fully closed position.

14. The system of claim 10, further comprising a third control valve system (CVS) fluidly coupled to the first CVS and the ROI, such that the third CVS is between the first CVS and the ROT, wherein the third CVS comprises:
a third pressure sensor installed in a downstream side of the third CVS, the third pressure sensor configured to detect a water pressure PD3 upstream of the ROI and generate a third sensor signal indicative of PD3;
a third valve that is movable between an open position and a fully closed position; and
a third controller that is configured to control a position of the first valve responsive to PD3;
wherein the third controller is configured to:
determine the pressure PD3 based at least in part on the third sensor signal;

compare PD3 to a third low pressure threshold LPT3; and cause the third valve to move to the fully closed position when PD3≤LPT3.

15. The system of claim 14, wherein the ROI is a water storage tank.

* * * * *